(12) United States Patent
Hatazawa et al.

(10) Patent No.: US 7,097,941 B1
(45) Date of Patent: Aug. 29, 2006

(54) SOLID ELECTROLYTIC SECONDARY BATTERY

(75) Inventors: Tsuyonobu Hatazawa, Miyagi (JP); Koichiro Kezuka, Miyagi (JP); Yukiko Iijima, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/446,641

(22) PCT Filed: Apr. 22, 1999

(86) PCT No.: PCT/JP99/02155
§ 371 (c)(1),
(2), (4) Date: Dec. 22, 1999

(87) PCT Pub. No.: WO99/56336
PCT Pub. Date: Nov. 4, 1999

(30) Foreign Application Priority Data
Apr. 27, 1998 (JP) .............................. P10-117509

(51) Int. Cl.
*H01M 6/24* (2006.01)
*H01M 6/18* (2006.01)
*H01M 4/62* (2006.01)

(52) U.S. Cl. ...................... 429/309; 429/316; 429/303; 429/217

(58) Field of Classification Search ................ 429/316, 429/303–306, 309, 199, 217, 300
See application file for complete search history.

(56) References Cited

U.S. PATENT DOCUMENTS

| | | | |
|---|---|---|---|
| 5,296,318 A | | 3/1994 | Gozdz et al. |
| 5,429,891 A | * | 7/1995 | Gozdz et al. |
| 5,565,284 A | | 10/1996 | Koga et al. |
| 5,571,634 A | | 11/1996 | Gozdz et al. |
| 5,756,230 A | * | 5/1998 | Gao et al. |
| 5,811,205 A | * | 9/1998 | Andrieu et al. ............. 429/137 |
| 5,922,493 A | * | 7/1999 | Humphrey, Jr. et al. .... 429/316 |
| 6,096,101 A | * | 8/2000 | Liu et al. .................... 29/623.1 |
| 6,103,414 A | * | 8/2000 | Cabasso et al. ............... 429/33 |
| 6,159,638 A | * | 12/2000 | Takatera et al. ............ 429/309 |
| 6,506,523 B1 | * | 1/2003 | Hatazawa et al. .......... 429/316 |

FOREIGN PATENT DOCUMENTS

| | | | |
|---|---|---|---|
| EP | 730316 A1 | * | 9/1996 |
| JP | 08236095 A | * | 9/1996 |
| WO | 9724777 | | 7/1997 |

OTHER PUBLICATIONS

NIST printout for Ethene, 1,1-diflouoro-. http://webbook.nist.gov (no date).*

* cited by examiner

*Primary Examiner*—Tracy Dove
(74) *Attorney, Agent, or Firm*—Sonnenschein Nath & Rosenthal LLP

(57) ABSTRACT

A solid-electrolyte secondary battery is provided which comprises a positive electrode, negative electrode and a solid electrolyte provided between the electrodes. The solid electrolyte contains as a matrix polymer a fluorocarbon polymer of 550,000 in weight-average molecular weight (Mw). The fluorocarbon polymer having a weight-average molecular weight of more than 550,000 shows an excellent adhesion to the active material layers of the positive and negative layers. Therefore, the high polymer solid (or gel) electrolyte adheres to the active material layers of the electrodes with a sufficient adhesive strength. A fluorocarbon polymer having a weight-average molecular weight (Mw) over 300,000 and under 550,000 may be used in combination with a fluorocarbon polymer of 550,000 or more in weight-average molecular weight to lower the viscosity for facilitating the formation of a film of the electrolyte.

5 Claims, 2 Drawing Sheets

SOLID ELECTROLYTIC SECONDARY BATTERY

FIELD OF THE INVENTION

The present invention relates to a solid-electrolyte secondary battery having a solid electrolyte (also a gel electrolyte) disposed therein between a positive electrode and negative electrode, and more particularly, to a novel solid-electrolyte secondary battery capable of an improved number of charge and discharge cycles, that is one of the performance requirements for the secondary batteries in practical use, and which can be manufactured with a higher productivity.

BACKGROUND OF THE INVENTION

In recent years, many portable electronic apparatuses such as an integral VTR/video camera unit, portable telephone, portable computer, etc. have been proposed, and they show a tendency to be more compact for their improved portability. Many developments and studies have been made to provide a thinner or bendable battery, more specifically, a secondary battery, or a lithium ion battery among others, for use as a portable power source in such a more compact portable electronic apparatus.

To attain such a thinner or bendable battery structure, active studies have been made concerning a solidified electrolyte for use in the battery. Especially, a gel electrolyte containing a plasticizer and a polymeric solid electrolyte made from a high molecular material having lithium salt dissolved therein are attracting much attention from many fields of industry.

As the high molecular materials usable to produce a high molecular solid electrolyte, a silicone gel, acryl gel, acrylonitrile, polyphosphazen-modified polymer, polyethylene oxide, polypropylene oxide, their composite polymer, cross-linked polymer, modified polymer, etc. have been reported. In the conventional secondary battery using a solid electrolyte made from one of these high molecular materials, however, since the electrolyte film has no sufficient film strength and adhesion to the battery electrodes, there occurs a nonuniformity between the charge and discharge currents, and a lithium dendrite easily takes place. Thus, the conventional secondary battery has a short charge and discharge cycle life (number of charge and discharge cycles), namely, it is critically disadvantageous in that it cannot meet the requirement "stable usability for a longer term" being one of the basic and important requirements for production of a commercial article.

Further, for a higher film strength of a solid electrolyte, it has been proposed to cross-link a trifunctional polyethylene glycol and diisocyanate derivative by reaction between them (as disclosed in the Japanese Unexamined Patent Publication No. 62-48716) or to cross-link polyethylene glycol diacrylate by polymerization (as disclosed in the Japanese Unexamined Patent Publication No. 62-285954). Because an unreacted substance or a solvent used for the reaction remains, the electrolyte has no sufficient adhesion to the battery electrodes. Moreover, the indispensable process of drying removal causes the productivity to be low. These methods are required for a further improvement.

As mentioned above, the high molecular solid or gel electrolyte has excellent characteristics not found with the liquid electrolytes, but when it is used in a battery, it can hardly be put in ideal contact with the battery electrodes. This is because the solid or gel electrolyte will not flow as the liquid electrolyte.

The contact of the high molecular solid or gel electrolyte with the battery electrodes has a large influence on the battery performance. Namely, if the contact between them is poor, the contact resistance between the high molecular solid or gel electrolyte and the battery electrodes is large so that the internal resistance of the battery is large. Furthermore, there cannot be an ideal ion movement between the high molecular solid or gel electrolyte and the electrodes, and so the battery capacity is also low. If such a battery is used for a long term, there occurs a nonuniformity between the charge and discharge currents and a lithium dendrite is likely to take place.

Therefore, in a battery using a high molecular solid or gel electrolyte, it is extremely important to adhere the high molecular solid or gel electrolyte to active material layers of electrodes of the battery with a sufficient adhesive strength.

To implement the above, it has been proposed as in the Japanese Unexamined Patent Publication No. 2-40867 to use a positive electrode composite in which a high molecular solid electrolyte is added to a positive active material layer of the positive electrode. In the battery disclosed in the Japanese Unexamined Patent Publication, a part of the high molecular solid electrolyte is mixed in the positive active material layer to improve the electrical contact between the high molecular solid electrolyte and positive-electrode active material layer.

However, in case the method disclosed in the Japanese Unexamined Patent Publication No. 2-40867 is adopted, the positive-electrode composite to which the high molecular solid electrolyte is added must be used to produce a positive plate and the high molecular solid electrolyte should be laminated on the positive plate. No ideal contact can be attained between the positive plate and solid electrolyte. More specifically, if a solid electrolyte having an irregular surface is laminated on an electrode layer, no good adhesion between them can be ensured and the internal resistance will be increased, with a result that the load characteristic becomes worse. Also, a positive or negative electrode composite in which a high molecular solid or gel electrolyte is added cannot easily be pressed to a sufficient extent because of the elasticity of the high molecular solid or gel electrolyte, and the grain spacing inside the composite is large, with a result that the internal resistance is increased. Also in this case, the load characteristic becomes worse. Furthermore, to prevent an electrolyte salt contained in the high molecular solid or gel electrolyte from being dissolved, the positive or negative electrode should be produced at a low humidity, their quality cannot easily be controlled, and the manufacturing costs are large.

SUMMARY OF THE INVENTION

Accordingly, the present invention has an object to overcome the above-mentioned drawbacks of the prior art by providing a solid electrolyte excellent in adhesion to the active material layers of the electrodes, and thus providing a solid-electrolyte secondary battery using therein the solid electrolyte to ensure a good electrical contact between the solid electrolyte and active material layers of a positive electrode and negative electrode of the battery.

Also, the present invention has another object to provide a solid-electrolyte secondary battery adapted to have an ideal grain spacing in the active material layers of the positive and negative electrode, an improved charge and discharge cycle life, and a high productivity.

It has been found that the molecular weight of a fluorocarbon polymer used as a matrix polymer in the solid electrolyte has a great influence on the characteristics of the electrolyte, use of a fluorocarbon polymer having a large molecular weight makes it possible to adhere a high molecular solid or gel electrolyte to the active material of the electrodes with a sufficient strength and provide good electrical contact between the solid or gel electrolyte and the active material of the positive and negative electrodes, and that use of such a fluorocarbon polymer provides a solid-electrolyte secondary battery having a longer charge and discharge life cycle and excellent productivity.

The solid-electrolyte secondary battery according to the present invention is completed based on the above findings by the Inventors and comprises a positive electrode and negative electrode and a solid electrolyte provided between the electrodes, the solid electrolyte containing as a matrix polymer a fluorocarbon polymer of 550,000 or more in weight-average molecular weight.

Note that the term "solid electrolyte" used herein refers to a so-called solid electrolyte as well as to a gel electrolyte in which a matrix polymer is plasticized by a plasticizer, for example. Therefore, the solid-electrolyte secondary battery of the present invention includes a gel-electrolyte secondary battery as well.

According to the present invention, a fluorocarbon polymer of 550,000 or more in weight-average molecular weight (Mw) is used as the matrix polymer. The fluorocarbon polymer of 550,000 or more in weight-average molecular weight assures an excellent adhesion of the electrolyte to the active material of the positive and negative electrodes. Therefore, it is possible to adhere the high molecular solid or gel electrolyte to the active material of the electrodes with a sufficient strength and thus reduce the internal resistance of the electrodes, thereby attaining an improved charge and discharge life cycle of the battery.

These objects and other objects, features and advantages of the present intention will become more apparent from the following detailed description of the preferred embodiments of the present invention when taken in conjunction with the accompanying drawings.

Figure 1:
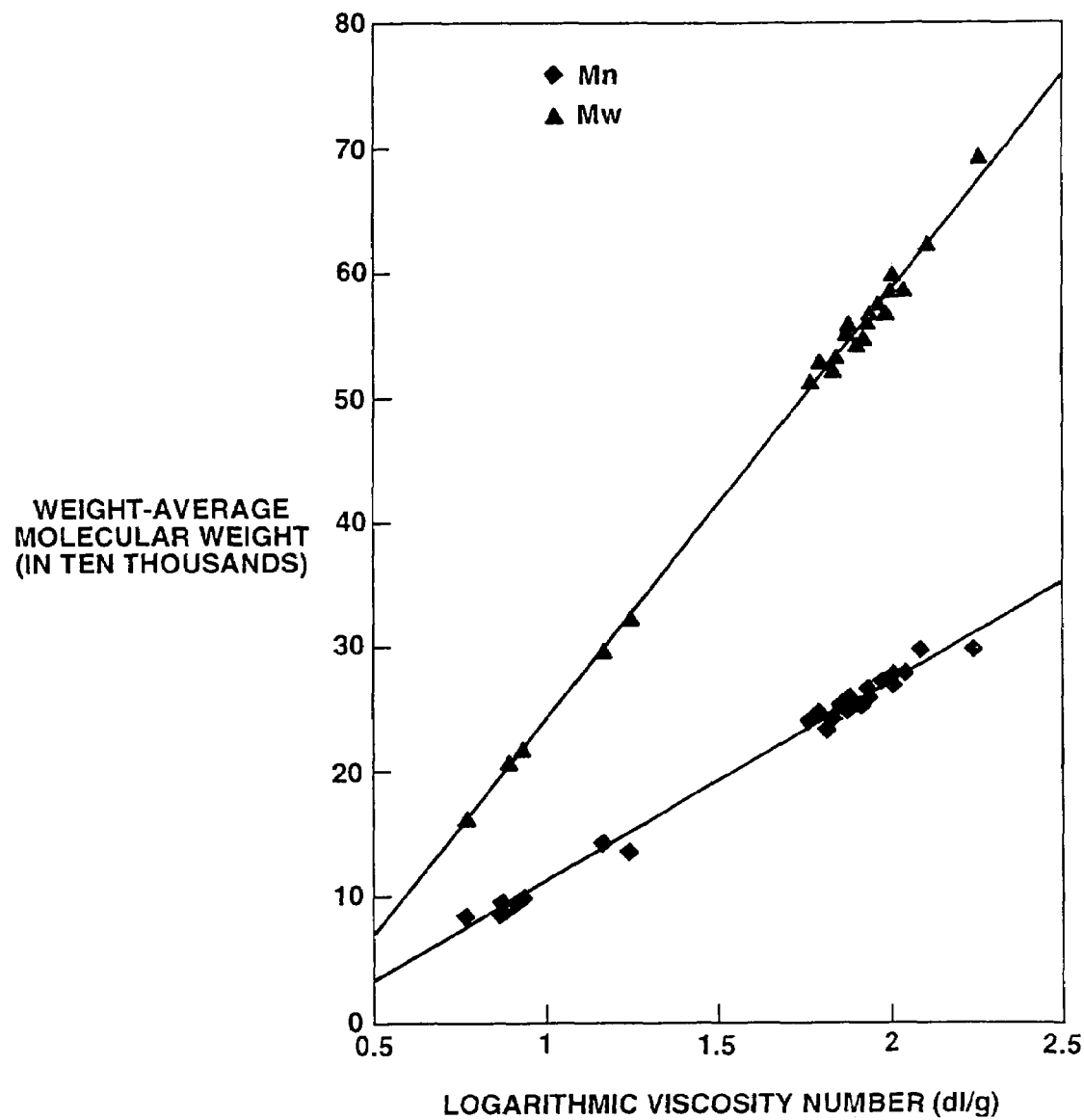
FIG. 1 shows a characteristic curve of the correlation between weight-average molecular weight (Mw), number-average molecular weight (Mn) and logarithmic viscosity number (dl/g)

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

The solid-electrolyte secondary battery according to the present invention uses a fluorocarbon polymer as a matrix polymer.

The fluorocarbon polymers usable as a matrix polymer in the solid electrolyte according to the present invention include, for example, polyvinylidene fluoride, vinylidene fluoride-hexafluoropropylene copolymer, vinylidene fluoride/tetrafluoroethylene copolymer, vinylidene fluoride/trifluoroethylene copolymer, etc. However, the fluorocarbon polymer is not limited only to these examples.

The fluorocarbon polymer used as the matrix polymer should have a weight-average molecular weight of 550,000 or more. If the fluorocarbon polymer has a weight-average molecular weight of under 550,000, it has no sufficient adhesive strength. Note that as the fluorocarbon polymer has a weight-average molecular weight increased from 300,000, it has a gradually increased adhesive strength. However, the adhesive strength assured by a weight-average molecular weight under 550,000 cannot always be said to be sufficient. To ensure a sufficient adhesive strength, the weight-average molecular weight (Mw) should be over 550,000.

The fluorocarbon polymer should desirably have a weight-average molecular weight of more than 550,000; however, for a weight-average molecular weight of more than 3,000,000, the polymer ratio has to be lowered to an impractical dilution ratio. The solid or gel electrolyte is produced by using, singly or as a component of the plasticizer, one of esters, ethers or carbonates usable in a battery to prepare a solution of the high molecular compound, electrolyte salt and solvent (and further a plasticizer for a gel electrolyte), impregnating the solution into a positive or negative electrode active material, and removing the solvent to solidify the electrolyte. Therefore, the esters, ethers or carbonates usable in the battery are limited of themselves. The esters, ethers or carbonates included in the limited range and having a weight-average molecular weight of more than 1,000,000 do not show a sufficient solubility to prepare a suitable solution.

Therefore, the weight-average molecular weight (Mw) of the fluorocarbon polymer should preferably range from 550,000 to 3,000,000, and more preferably from 550,000 to 1,000,000.

In case a fluorocarbon polymer of 550,000 or more in weight-average molecular weight (Mw) is used, another fluorocarbon of over 300,000 and under 550,000 in Mw may be used in combination to lower the viscosity for facilitating to form a film of the electrolyte. In this case, however, the ratio of the fluorocarbon polymer of 550,000 or more in Mw should preferably be 30% or more by weight. If the ratio of the fluorocarbon polymer of 550,000 or more in Mw is lower, it will be difficult to ensure an intended sufficient adhesive strength of the solid electrolyte.

The fluorocarbon polymer of 550,000 or more in Mw is prepared by using a peroxide and polymerizing a monomer at a temperature ranging from room temperature to 200° C. and under an atmospheric pressure of 300 or less. It is industrially produced by the suspension polymerization or emulsion polymerization process.

In the suspension polymerization process, water is used as a medium, a dispersant is added to the monomer to disperse the latter as liquid drops into the medium, the organic peroxide dissolved in the monomer is polymerized as a polymerization initiator.

Also, during suspension polymerization of the monomer in the medium in the presence of an oil-soluble polymerization initiator (will be referred to as "initiator" hereinunder), a monomer selected from hexafluoropropylene, ethylene tetrafluoride, etc. may be used as a copolymer component in 1 to 7% by weight of all the monomers to provide a copolymer.

The hexafluoropropylene or ethylene tetrafluoride may be totally added into a polymerization container during the initial charging. Otherwise, it may partially or wholly be added in a divisional or continuous manner to the polymerization container after the initial charging.

A chain transfer agent used at this time includes acetone, isopropyl acetate, ethylacetate, diethyl carbonate, dimethyl carbonate, baked ethyl carbonate, propionic acid, trifluoroacetic acid, trifluoroethyl alcohol, formaldehyde dimethyl acetal, 1,3-butadiene epoxide, 1,4-dioxane, β-buthyl lactone, ethylene carbonate, vinylene carbonate or the like. Among them, however, acetone or ethylene acetate should preferably be used for easy availability and handling.

The initiator may be any one of dinormalpropyl peroxidicarbonate (NPP), diisopropyl peroxidicarbonate or the like.

For each of the initiator and chain transfer agent, a king and amount may be selected and one or more than two kinds be used in combination to attain a desired molecular weight.

The dispersant usable in the process of preparing the electrolyte may be any one of partially suspended polyvinyl acetate used in ordinary suspension polymerization, a water-soluble cellulose ether such as methyl cellulose, hydroxyethyl cellulose, hydroxypropyl cellulose, hydroxypropyl methyl cellulose or the like, a water-soluble polymer such as gelatin or the like, for example.

The water, monomer, dispersant, initiator, chain transfer agent and other auxiliaries may be charged in any manner which would be suitably used in ordinary suspension polymerization.

For example, the water, dispersant, initiator, chain transfer agent and other auxiliaries are charged, and then put under a reduced pressure for deaeration, the monomer is charged, and agitation of the mixture is started. After the mixture reaches a predetermined temperature, it is kept at that temperature for proceeding of the polymerization. When the conversion reaches, for example, 10 to 50%, the chain transfer agent is charged under pressure. The polymerization is further allowed to progress. When the conversion reaches 80% or more, for example, an unreacted monomer is recovered. Then the polymer is dehydrated, washed and dried to provide a polymer.

By controlling the temperature, pressure and reaction time appropriately at this time, it is possible to provide a high-molecular-weight fluorocarbon polymer of 550,000 or more in weight-average molecular weight.

The fluorocarbon polymer thus produced forms, together with the electrolyte salt and solvent (in addition, a plasticizer for a gel electrolyte), a solid or gel electrolyte. The electrolyte is provided between a positive electrode and negative electrode. At this time, the fluorocarbon polymer should preferably be impregnated in the state of a solution into the active material of the positive or negative electrode, and the solvent be removed for solidification of the electrolyte. Thereby a part of the electrolyte is impregnated into the active material of the positive or negative electrode to provide a higher adhesive strength which can ensure an improved adhesion of the electrolyte to the electrodes.

In the solid or gel electrolyte, the matrix polymer is used in 2 to 30% by weight and an ester, ether or a carbonate is used as one component of the solvent or plasticizer.

The solid or gel electrolyte contains a lithium salt which may be used in ordinary battery electrolytes. More particularly, the lithium salt may be selected from lithium chloride, lithium bromide, lithium iodide, lithium chlorate, lithium perchlorate, lithium bromate, lithium iodate, lithium nitrate, tetrafluoro lithium borate, hexafluoro lithium phosphate, lithium acetate, bis(trifluoromethane sulfonyl)imide lithium, $LiAsF_6$, $LiCF_3SO_3$, $LiC(SO_2CF_3)_3$, $LiAlCl_4$, $LiSiF_6$, etc.

These lithium salts may be used singly or in combination as mixed together, but among them, $LiPF_6$ and $LiBF_4$ should desirably be used for oxidation stability.

The dissolution concentration of the lithium salt should preferably be 0.1 to 3.0 mols/liter in the plasticizer for a gel electrode, and more preferably 0.5 to 2.0 mols/liter.

The solid-electrolyte secondary battery according to the present invention can be constructed similarly to the conventional lithium ion secondary battery provided that it uses the above-mentioned solid or gel electrolyte.

That is, the negative electrode of a lithium ion battery may be made of a material into or from which lithium ion can be inserted or extracted. The material for the negative electrode may be, for example, a carbon material such as a carbon material difficult to be graphitized or a graphite material. More particularly, the material may be any one selected from carbon materials such as pyrocarbons, cokes (pitch coke, needle coke, petroleum coke), graphites, vitreous carbons, sintered organic high molecular compounds (phenol resin, furan resin or the like sintered at an appropriate temperature for carbonization), carbon fiber, activated charcoal and the like. In addition, it may be any one of materials into or from which lithium ion can be inserted or extracted, including high molecular compounds such as polyacetylene, polypropyl, etc., oxides such as $SnO_2$, etc. For forming a negative electrode from such a material, a well-known binder or the like may be added to the material.

The positive electrode may be formed from a metal oxide, metal sulfide or a special high molecular compound used as a positive electrode active material depending upon an intended type of battery. For a lithium ion battery, for example, the positive electrode active material may be a metal sulfide or oxide containing no lithium such as $TiS_2$, $MoS_2$, $NbSe_2$, $V_2O_5$ or the like, or a lithium composite oxide or the like containing as the base $LiMO_2$ (M is one or more kind of transition metal, and x differs depending upon the charged or discharged extent of the battery, normally over 0.05 and under 1.10). The transition metal M composing the lithium composite oxide should preferably be Co, Ni, Mn or the like. More particularly, the lithium composite oxides include $LiCoO_2$, $LiNiO_2$, $LiNi_yCO_{i-y}O_2 (0<y<1)$, $LiMn_2O_4$. These lithium composite oxides can be a positive electrode active material generating a high voltage and providing excellent energy density. The positive electrode may be formed from more than one of these active materials. For forming a positive electrode from any of these active materials, a well-known conducting material, binder or the like may be added to the active material.

The battery according to the present invention is not limited to any special shape but may be designed to have a cylindrical, square or rectangular, coin, button or any other shape. Also, the battery according to the present invention may freely be dimensioned large, thin or otherwise.

The present invention will further be described herebelow concerning the experimental embodiments of the battery based on the experiment results.

Example of Polymerizing Conditions for Fluorocarbon Polymer

The following monomers and auxiliaries were charged into a pressure-resistant autoclave made of a stainless steel and having a volume of 14 liters, and the polymerization was started at a temperature of 25° C.:

| | |
|---|---|
| Vinylidene fluoride | 93 parts by weight (3,000 g) |
| Hexafluoropropylene | 7 parts by weight |
| Purified water | 300 parts by weight |
| Methyl cellulose | 0.1 part by weight |
| Soda pyrophosphate | 0.2 part by weight |
| NPP | 0.61 part by weight |

In 3 to 24 hours after start of the polymerization (when the conversion of 30 to 80% has been attained), 3.0 parts by weight of ethyl acetate was added to the mixture and the polymerization was allowed to proceed. When the internal pressure of the polymerization container decreased by 50% for example from the equilibrium pressure after the polymerization was started down, the unreacted monomer was recovered, a polymer slurry thus produced was dehydrated, washed and dried.

Molecular Weight Measurement a. Distribution of Molecular Weight (Mw/Mn)

A gel-permeation chromatograph (8010 series by Toso, with two columns TSK-GEL GMHXL of 7.8 mm in diameter, 300 mm in length, connected in series) was used to measure the weight-average molecular weight (Mw) of a dimethyl acetoamide solution in which the powder of the polymer obtained as in the above was dissolved at a concentration of 0.2% by weight at a temperature of 40° C. and flow rate of 0.8 ml/min.

b. Composition Analysis of the Polymer

The composition was measured using $^{19}$F NMR.

c. Logarithmic Viscosity Number

A Ubbelohde viscometer was used to measure an efflux time at 30° C. of a solution in which the powder of the polymer was dissolved in dimethyl formamide at a concentration of 4 g/liter. The following equation was used to calculate a logarithmic viscosity number from the measured efflux time:

$$\text{Logarithmic viscosity number } [\eta]=1n(\eta rel)/C(\text{dl/g})$$

where ηrel: Efflux time of sample solution/Efflux time of solvent

C: Concentration of sample solution (0.4 g/dl)

FIG. 1 shows the correlation between the measured weight-average molecular weight (Mw), number-average molecular weight (Mn) and logarithmic viscosity number.

Experimental Embodiment 1

First, a negative electrode was prepared as in the following:

Ninety parts by weight of a crushed graphite powder and 10 parts by weight of vinylidene fluoride/hexafluoropropylene copolymer as a binder were mixed together to prepare a negative electrode mixture. The mixture was dispersed in N-methyl-2-pyrolidone to produce a slurry.

The slurry was applied uniformly to one side of a copper foil stripe of 10 μm in thickness, used as an anode collector. After the slurry was dried, the copper foil stripe was compressed and formed by a roll press to prepare a negative electrode.

On the other hand, a positive electrode was prepared as in the following:

To produce a positive electrode active material (LiCoO$_2$), lithium carbonate and cobalt carbonate were mixed at a ratio of 0.5 mol to 1 mol and sintered in the atmosphere at 900° C. for 5 hours. Ninety one parts by weight of the LiCoO$_2$ produced, 6 parts by weight of graphite as a conducting material and 10 parts by weight of vinylidene fluoride/hexafluoropropylene copolymer were mixed together to prepare a positive electrode mixture. The mixture was further dispersed in N-methyl-2-pyrolidone to produce a slurry. The slurry was applied uniformly to one side of an aluminum foil stripe of 20 μm in thickness used as a cathode collector. After the slurry was dried, the aluminum foil stripe was compressed and formed by the roll press to produce a positive electrode.

Further, a solid electrolyte (or gel electrolyte) was prepared as in the following:

The negative and positive electrodes were applied uniformly with a solution in which 30 parts by weight of a plasticizer composed of 42.5 parts by weight of ethylene carbonate (EC), 42.5 parts by weight of propylene carbonate (PC) and 15 parts by weight of LiPF$_6$, 10 parts by weight of polyvinyl fluoride being a matrix polymer of 600,000 in weight-average molecular weight (logarithmic viscosity number of 1.93) and 60 parts by weight of diethyl carbonate were mixed and dissolved. Thus, the solution was impregnated into the electrodes. The electrodes were left at normal temperature for 8 hours. Thereafter, the dimethyl carbonate was vaporized for removal to provide a gel electrolyte.

The negative and positive electrodes applied with the gel electrolyte were superposed one on another for the gel electrolytes thereon to opposite to each other, and a pressure was applied to the electrodes, thereby preparing a flat gel-electrode battery of 2.5 cm by 4.0 cm in area and 0.3 mm in thickness.

Figure 2:
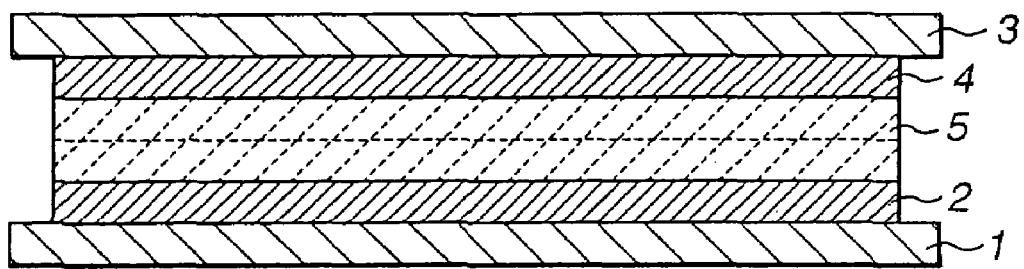
FIG. 2 is a sectional view of an experimental battery of the present invention.

FIG. 2 schematically illustrates the battery thus prepared. As seen, it comprises a negative electrode having an anode collector 1 on which an anode active material layer 2 was formed, a positive electrode having a cathode collector 3 on which a cathode active material layer 4 is formed, and a gel electrolyte 5 applied to the anode and cathode active material layers 2 and 4, respectively.

Experimental Embodiment 2

A flat gel electrolyte battery was prepared in a similar manner to that in the experimental embodiment 1 having been described above except that 7 parts by weight of a polyvinylidene fluoride of 700,000 in weight-average molecular weight (Mw) and 3 parts by weight of a polyvinylidene fluoride of 300,000 in weight-average molecular weight (Mw) were used as matrix polymers.

Experimental Embodiment 3

A flat gel electrolyte battery was prepared in a similar manner to that in the experimental embodiment 1 having been described above except that a vinylidene fluoride/hexafluoropropylene copolymer having a weight-average molecular weight (Mw) of 600,000 (content of the hexafluoropropylene was 7.0% by weight as measured by NMR) was used as a matrix polymer.

Experimental Embodiment 4

A flat gel electrolyte battery was prepared in a similar manner to that in the experimental embodiment 1 having been described above except that a vinylidene fluoride/hexafluoropropylene copolymer having a weight-average molecular weight (Mw) of 700,000 (content of the hexafluoropropylene was 7.0% by weight as measured by NMR) and a vinylidene fluoride/hexafluoropropylene copolymer having a weight-average molecular weight (Mw) of 300,000 (content of the hexafluoropropylene was 7.0% by weight as measured by NMR) were used as matrix polymers at a ratio in weight of 7:3.

Experimental Embodiment 5

A flat gel electrolyte battery was prepared in a similar manner to that in the experimental embodiment 1 having been described above except that a vinylidene fluoride/hexafluoropropylene copolymer having a weight-average molecular weight (Mw) of 800,000 (content of the hexafluoropropylene was 7.0% by weight as measured by NMR), vinylidene fluoride/hexafluoropropylene copolymer having a weight-average molecular weight (Mw) of 600,000 (content of the hexafluoropropylene was 7.0% by weight as measured by NMR) and a vinylidene fluoride/hexafluoropropylene copolymer having a weight-average molecular weight (Mw) of 300,000 (content of the hexafluoropropylene was 7.0% by weight as measured by NMR) were used as matrix polymers at a ratio in weight of 3:3:4.

Experimental Embodiment 6

A flat gel electrolyte battery was prepared in a similar manner to that in the experimental embodiment 1 having been described above except that a vinylidene fluoride/hexafluoropropylene copolymer having a weight-average molecular weight (Mw) of 2,000,000 (content of the hexafluoropropylene was 7.0% by weight as measured by NMR) was used as a matrix polymer.

Comparative Example 1

A flat gel electrolyte battery was prepared in a similar manner to that in the experimental embodiment 1 having been described above except that a vinylidene fluoride/hexafluoropropylene copolymer having a weight-average molecular weight (Mw) of 300,000 (content of the hexafluoropropylene was 7.0% by weight as measured by NMR) was used as a matrix polymer.

Comparative Example 2

A flat gel electrolyte battery was prepared in a similar manner to that in the experimental embodiment 1 having been described above except that a polyvinylidene fluoride/hexafluoropropylene copolymer having a weight-average molecular weight (Mw) of 500,000 was used as a matrix polymer.

Comparative Example 3

A flat gel electrolyte battery was prepared in a similar manner to that in the experimental embodiment 1 having been described above except that a vinylidene fluoride/hexafluoropropylene copolymer having a weight-average molecular weight (Mw) of 380,000 (content of the hexafluoropropylene was 7.0% by weight as measured by NMR) was used as a matrix polymer.

Evaluation

The experimental embodiments 1 to 6 and comparative examples 1 to 3 were tested on the peel strength, and further on the charge and discharge cycles.

Figure 3:
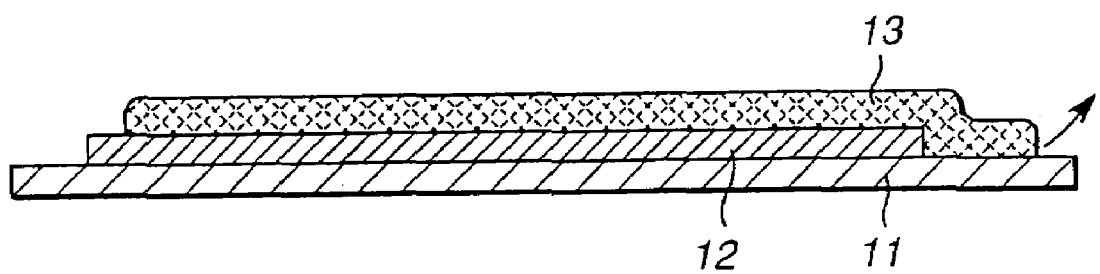
FIG. 3 is also a sectional view of the peel test equipment.

The peel strength was measured as in the following. Namely, an electrode active material layer 12 was formed on an electric collector 11, and a gel electrolyte 13 was applied to the active material 13, as shown in FIG. 3. The test piece thus prepared was pulled in the direction of arrow (180°) with a weight of 500 g at a rate of 10 cm/sec or so. The test results are shown in Table 1 with a marking (o) for the breakage of the gel electrolyte 13 at the end of the electrode active material layer 12 and a marking (x) for the peeling of the gel electrolyte 13 and electrode active material layer 12 from the boundary between them.

On the other hand, the charge and discharge cycle test was done 500 cycles by discharging the theoretical capacity (0.5C) for 2 hours (hourly rate). Each of the batteries was evaluated as in the following.

Each battery was charged at a constant current and voltage at a temperature of 23° C. up to the upper limit of 4.2 V, and then discharged at a constant current (0.5C) down to an end voltage of 3.2 V. The discharge capacity was thus determined and evaluated with a discharge output maintenance factor after the 500 cycles of charge and discharge. The test results are also shown in Table 1.

TABLE 1

|  | Peel strength | Discharge output maintenance factor (0.5 C) after 500 cycles |
| --- | --- | --- |
| Embodiment 1 | o | 85% |
| Embodiment 2 | o | 90% |
| Embodiment 3 | o | 92% |
| Embodiment 4 | o | 95% |
| Embodiment 5 | o | 95% |
| Embodiment 6 | o | 93% |
| Example 1 | x | 48% |
| Example 2 | x | 55% |
| Example 3 | x | 50% |

As apparent from Table 1, each of the experimental embodiments using the fluorocarbon of 550,000 or more in weight-average molecular weight (Mw) as a gel electrolyte was proved to be excellent in peel strength and also in output maintenance factor after the cycle test.

The experimental embodiment 6 having a fluorocarbon polymer of 2,000,000 in weight-average molecular weight (Mw) is excellent in peel strength and output maintenance factor as shown, but it showed a productivity not so good because of its high viscosity.

As having been described in the foregoing, the present invention can provide a solid electrolyte excellent in adhesion to the electrode active material layers, and thus the present invention can also provide a solid-electrolyte secondary battery with a solid electrolyte having a good electrical contact with positive and negative active material layers and having a considerably improved charge and discharge life cycle.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

The invention claimed is:

1. A solid-electrolyte secondary battery comprising:
   (a) a positive electrode;
   (b) a negative electrode;
   (c) a solid electrolyte comprising a matrix polymer comprising a first fluorocarbon polymer having a weight-average molecular weight of greater than 550,000 and less than 1,000,000;
   (d) wherein the matrix polymer further comprises a second fluorocarbon polymer having a weight-average molecular weight of greater than 300,000 and less than 550,000;
   (e) wherein the matrix polymer comprises 30 percent or more by weight of the fluorocarbon polymer having a weight-average molecular weight of greater than 550,000 and less than 1,000,000;
   (f) wherein the positive electrode has a face which is directed towards the negative electrode and the solid-electrolyte layer is formed on the face of the positive electrode and impregnates into the face a solution in which the solid electrolyte is dissolved;
   (g) wherein the negative electrode has a face directed toward the positive electrode and the solid-electrolyte layer is formed on the face and impregnates into the face a solution in which the solid electrolyte is dissolved; and
   (h) wherein the first and the second fluorocarbon polymer are a polyvinylidene fluoride/hexafluoropropylene copolymer, wherein the content of hexafluoropropylene is not less than 1% and not more than 7% by weight.

2. The solid-electrolyte secondary battery of claim 1 wherein at least one of the positive and negative electrodes comprises a binder comprising the matrix polymer of the solid electrolyte.

3. The solid-electrolyte secondary battery of claim 1 wherein the negative electrode comprises a material which is capable of intercalating or deintercalating a lithium ion.

4. The solid-electrolyte secondary battery of claim 3 wherein the material which is capable of intercalating or deintercalating a lithium ion comprises a carbon material.

5. The solid-electrolyte secondary battery of claim 1, wherein the positive electrode comprises a composite oxide of lithium and a transition metal.

* * * * *